US012297978B1

(12) United States Patent
Long

(10) Patent No.: US 12,297,978 B1
(45) Date of Patent: May 13, 2025

(54) MULTI-ANGLE ADJUSTABLE SPOT-FLOOD LIGHT

(71) Applicant: Dongguan Kangjuhong Optoelectronics Technology Co., Ltd, Dongguan (CN)

(72) Inventor: Hu Long, Dongguan (CN)

(73) Assignee: Dongguan Kangjuhong Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 18/433,506

(22) Filed: Feb. 6, 2024

(30) Foreign Application Priority Data

Nov. 2, 2023 (CN) ........................ 202322968226.8

(51) Int. Cl.

| | |
|---|---|
| ***F21V 14/00*** | (2018.01) |
| ***F21V 5/00*** | (2018.01) |
| ***F21V 14/06*** | (2006.01) |
| *F21V 5/04* | (2006.01) |
| *F21Y 115/10* | (2016.01) |

(52) U.S. Cl.
CPC .............. *F21V 14/06* (2013.01); *F21V 5/008* (2013.01); *F21V 5/048* (2013.01); *F21Y 2115/10* (2016.08)

(58) Field of Classification Search
CPC .......... F21V 14/06; F21V 5/008; F21V 5/048; F21Y 2115/10
See application file for complete search history.

(56) References Cited

U.S. PATENT DOCUMENTS

2022/0049838 A1* 2/2022 Huang ...................... F21V 9/14
2022/0373761 A1* 11/2022 Chen ...................... G03B 17/12
2024/0255131 A1* 8/2024 Yu .......................... F21V 17/12

* cited by examiner

*Primary Examiner* — Gerald J Sufleta, II

(57) ABSTRACT

The present invention is applicable to the technical field of lamp products, and provides a multi-angle adjustable spot-flood light, comprising a lamp holder, a light source, an optical assembly and an angle adjustment mechanism. Wherein the optical assembly comprises a first optical lens and a second optical lens spaced from and parallel to the first optical lens, a first optical structure is arranged on a light-emitting surface of the first optical lens, and a second optical structure is arranged on a light incident surface of the second optical lens. The angle adjustment mechanism comprises a first lens holder fixedly connected to the lamp holder and a second lens holder rotatable relative to the first lens holder, the first optical lens is fixed on the first lens holder, and the second optical lens is fixed on the second lens holder.

8 Claims, 6 Drawing Sheets

MULTI-ANGLE ADJUSTABLE SPOT-FLOOD LIGHT

BACKGROUND

Technical Field

The disclosure pertains to the technical field of virtual reality, and specifically pertains to an interaction control method and an interaction control device for virtual reality.

BACKGROUND

A downlight is often referred to as a spotlight. The downlight is a lamp that specifies that an illuminated surface has an illuminance greater than that of the surrounding environment. It can be aimed in any direction and is not affected by weather conditions. The downlight is commonly used in places such as mines, building outlines, stadiums and ball fields where a relatively large light coverage is required. This lamp has a particularly narrow beam, and is also referred to as a searchlight.

A floodlight is a point source of light. The floodlight can illuminate evenly in all directions, and has an illumination range that can be arbitrarily adjusted. The floodlight appears as an octahedral icon in the scene and is often used in renderings or as a light source during photography. The light of the floodlight is highly diffuse and has no direction. A light emitted by the floodlight fades much more slowly than a light emitted by the spotlight, and some floodlights fade very slowly, acting like a light source that does not cast shadows. The light projected by the spotlight is directional and well-defined, and can illuminate a specific area.

The downlight and the floodlight are both commonly used lamps in lighting engineering; however, they have certain differences. First, the illumination pattern of the floodlight is diffuse. The downlight has a light-gathering function and can be directed to a specified direction.

In order to adapt to various use environments, a lamp integrating a spotlight and a floodlight by using a double-lens combination mode appears, for example, spotlighting or floodlighting can be implemented by replacing a lens, or spotlighting or floodlighting can also be implemented by focusing and emitting a cover plate through a distance between a cover plate light source and a convex lens. However, there is a movable stroke in the middle when the distance between the light source and the convex lens is changed, and a larger stroke is needed to obtain a wide range of spotlighting and floodlighting; consequently, the size of the lamp becomes very large, and this method cannot achieve control of a precise reflection angle, making it difficult to obtain a satisfactory spotlight effect.

SUMMARY

In order to solve the problems existing in the prior art, the present invention provides a multi-angle adjustable spot-flood light.

The multi-angle adjustable spot-flood light comprises a lamp holder (10), a light source (20), an optical assembly (30), and an angle adjustment mechanism (40).

The optical assembly (30) comprises a first optical lens (31) and a second optical lens (32) that is spaced from and parallel to the first optical lens (31). Wherein a first optical structure (106) is arranged on a light-emitting surface (104) of the first optical lens (31), and a second optical structure (107) is arranged on a light incident surface (105) of the second optical lens (32).

The angle adjustment mechanism (40) comprises a first lens holder (41) fixedly connected to the lamp holder (10) and a second lens holder (42) rotatable relative to the first lens holder (41). Wherein the first optical lens (31) is fixed on the first lens holder (41), and the second optical lens (32) is fixed on the second lens holder (42).

An angle of the second lens holder (42) is adjusted by rotation to change a position of the second optical structure (322) on the second optical lens (32) relative to the first optical structure (312).

Preferably, a positioning structure (43) is further arranged between the first lens holder (41) and the second lens holder (42).

Preferably, the positioning structure (43) comprises a limiting elastic sheet (431) arranged on the second lens holder (42) and extending towards the first lens holder (41) and a first limiting groove (432) arranged on a peripheral wall of the first lens holder (41). Wherein the limiting elastic sheet (431) is provided with a limiting bump (433) matched with the first limiting groove (432), and when the second lens holder (42) is rotated, the limiting bump (433) is embedded into the first limiting groove (432) to form limiting.

Preferably, the limiting elastic sheet (431) is arranged on an inner peripheral wall of the second lens holder (42) and extends towards a direction of the first lens holder (41), and the first limiting groove (432) is arranged on an inner peripheral wall of the first lens holder (41).

Preferably, the positioning structure (43) comprises a bead shifting screw arranged on an outer peripheral wall of the second lens holder (42) and a first limiting groove (432) arranged on the peripheral wall of the first lens holder (41). When the second lens holder (42) is rotated, a shifting bead of the bead shifting screw is embedded into the first limiting groove (432) to form limiting.

Preferably, the positioning structure (43) comprises a second limiting groove (436) arranged on the second lens holder (42) and extending circumferentially, and a limiting boss (437) arranged on the first lens holder (41) and extending to the second limiting groove (436). Wherein two ends of the second limiting groove (436) limit the limiting boss (437) so as to limit a rotation range of the second lens holder (42).

Preferably, the angle adjustment mechanism (40) further comprises a protective cover (45) covering on the second lens holder (42) and fixedly connected to the first lens holder (41).

Preferably, a first groove (311) is arranged on the light incident surface of the first optical lens (31), an annular boss (312) is further arranged on a periphery of a notch of the first groove (311), and a clamping buckle (313) is arranged in the annular boss (312). The light source (20) comprises a light source holder (21) and an LED (22) fixed on the light source holder, and the light source holder (21) is clamped in the annular boss (312) through the clamping buckle (313).

Preferably, a partition plate (417) is arranged inside the first lens holder (41), the first optical lens (31) is arranged at one side of the partition plate (417), a power supply board (27) is arranged at the other side of the partition plate (417), and the power supply board (27) is fixed on the partition plate (417) by glue (28).

Preferably, the multi-angle adjustable spot-flood light further comprises a lamp holder bracket (70) rotatably connected to the lamp holder (10).

Compared with the prior art, the multi-angle adjustable spot-flood light according to the present invention can achieve multi-angle adjustment of spotlighting and floodlighting.

BRIEF DESCRIPTION OF THE DRAWINGS

In order to more clearly explain the embodiment of the present invention or the technical scheme in the prior art, the following will briefly introduce the attached drawings that need to be used in the embodiment. It is obvious that the attached drawings in the following description are only some embodiments of the present invention. For ordinary technicians in the art, without paying creative labor, other drawings can also be obtained from these drawings.

DESCRIPTION OF THE EMBODIMENTS

In order to make the objectives, technical solutions and advantages of the present invention more apparent, the present invention is further described in detail below with reference to the accompanying drawings and embodiments. It should be understood that the specific embodiments described herein are merely illustrative of the present invention and do not limit the present invention.

Figure 1:
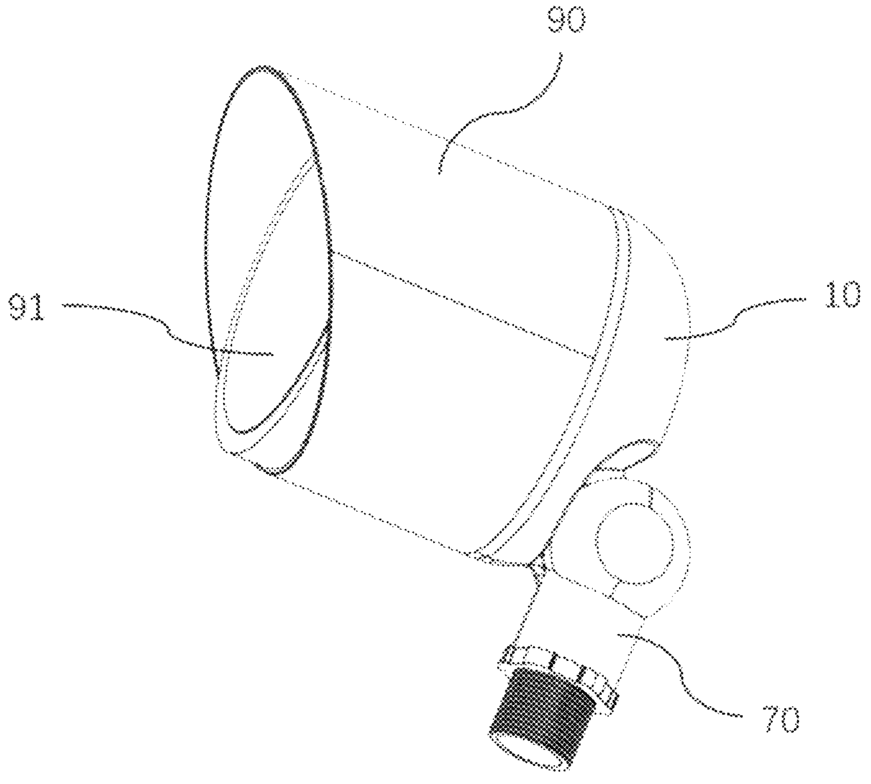
FIG. 1 is a schematic diagram of a three-dimensional structure of a multi-angle adjustable spot-flood light according to an embodiment of the present invention.
Figure 2:
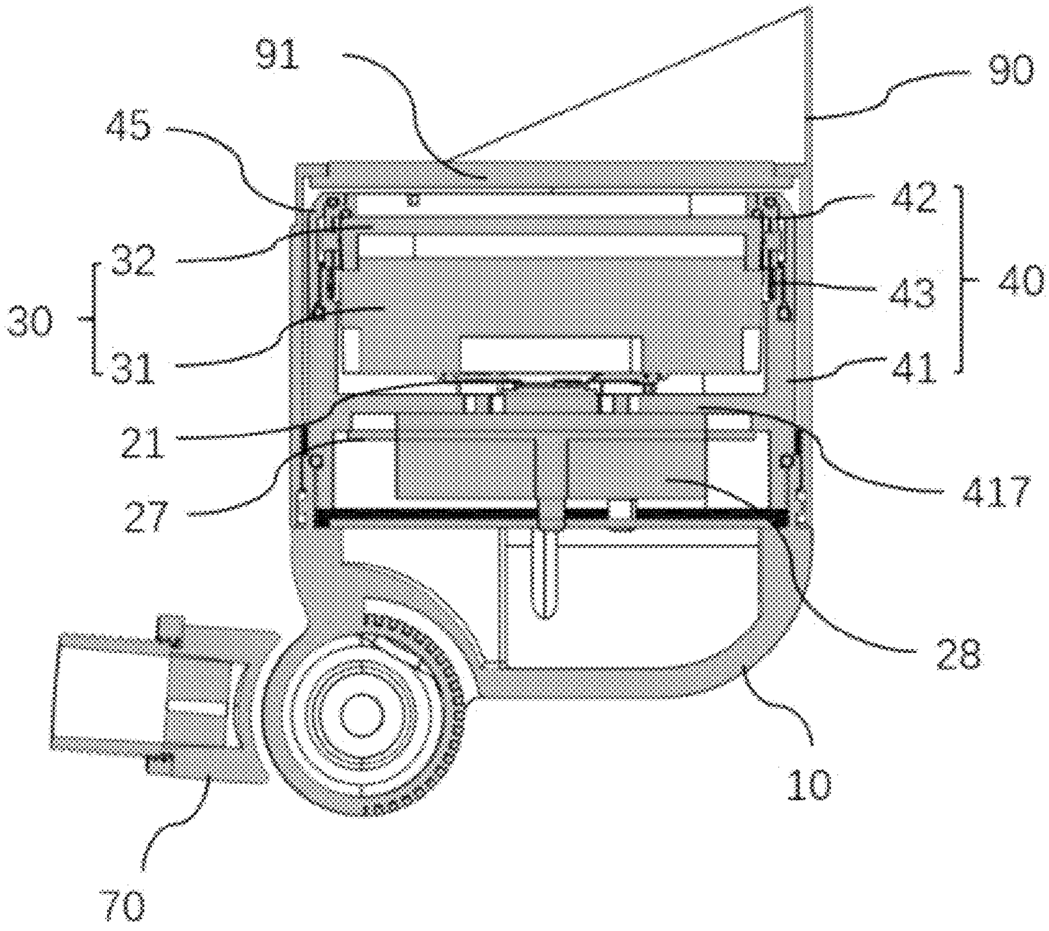
FIG. 2 is a schematic diagram of a cross-sectional structure of a multi-angle adjustable spot-flood light according to an embodiment of the present invention.
Figure 3:
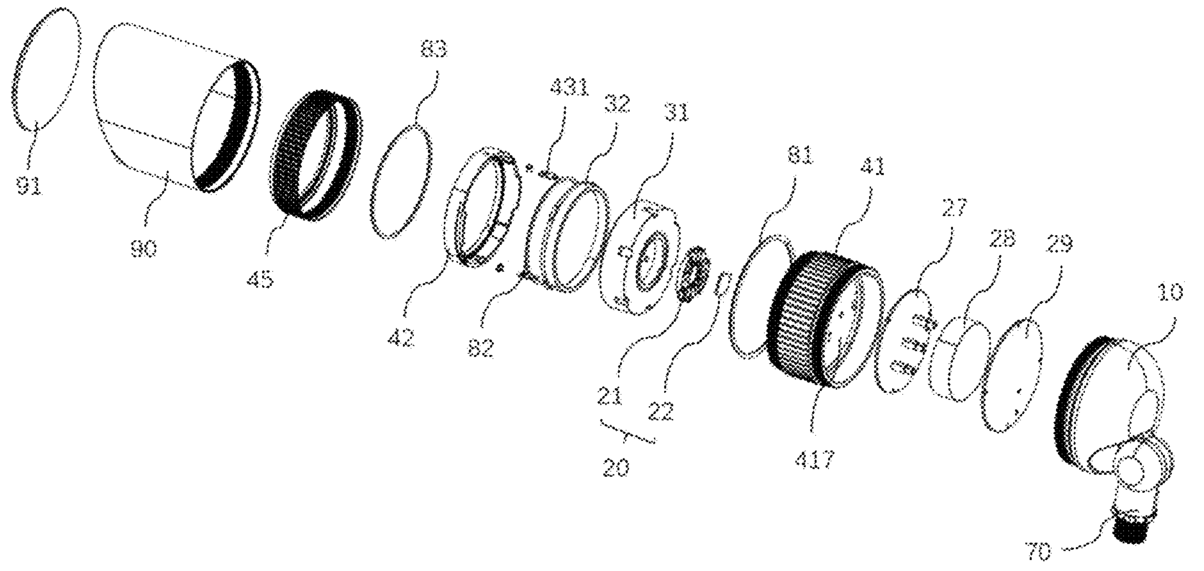
FIG. 3 is a schematic exploded view of a structure of a multi-angle adjustable spot-flood light according to an embodiment of the present invention.

As shown in FIGS. 1 to 3, an embodiment of the present invention provides a multi-angle adjustable spot-flood light, comprising a lamp holder 10, a light source 20, an optical assembly 30 and an angle adjustment mechanism 40.

In this embodiment, the optical assembly 30 comprises a first optical lens 31 and a second optical lens 32 that is spaced from and parallel to the first optical lens 31. Wherein a first optical structure 106 is arranged on a light-emitting surface 104 of the first optical lens 31, and a second optical structure 107 is arranged on a light incident surface 105 of the second optical lens 32.

In this embodiment, the angle adjustment mechanism 40 comprises a first lens holder 41 fixedly connected to the lamp holder 10 and a second lens holder 42 rotatable relative to the first lens holder 41. The first optical lens 31 is fixed on the first lens holder 41, and the second optical lens 32 is fixed on the second lens holder 42. Wherein an angle of the second lens holder 42 is adjusted by rotation to change a position of the second optical structure 322 on the second optical lens 32 relative to the first optical structure 312.

Further, the multi-angle adjustable spot-flood light further comprises a cylinder body 90, wherein the cylinder body 90 is connected to the lamp holder 10 through a thread and is used to protect the outside of the lamp, and meanwhile, a protective lens 91 is arranged at a tail end of the cylinder body 90 and is used to protect the internal optical lens 30.

Figure 8:
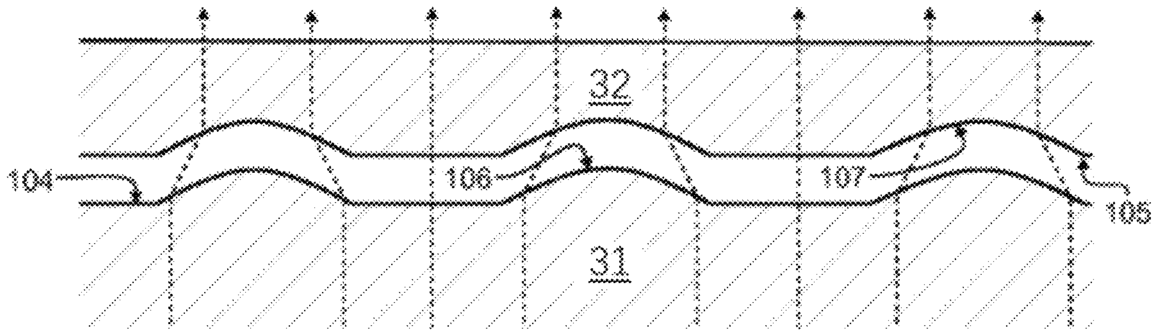
FIG. 8 is a schematic diagram of an optical structure on an optical lens according to an embodiment of the present invention and a floodlighting status.
Figure 9:
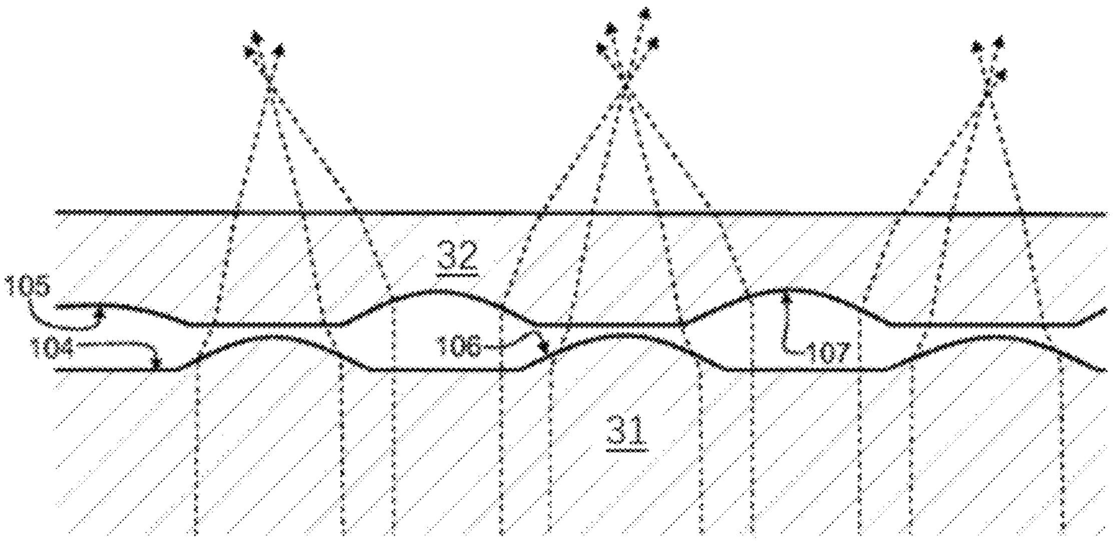
FIG. 9 is a schematic diagram of an optical structure on an optical lens according to an embodiment of the present invention and a spotlighting status.

In this embodiment, as shown in FIGS. 8 and 9, the first optical structures 106 on the light-emitting surface 104 of the first optical lens 31 are a plurality of convex structures, and the corresponding second optical structures 107 on the light incident surface 105 of the second optical lens 32 are a plurality of concave structures. As shown in FIG. 8, when the convex structure and concave structure are in place, a light path indicated by the arrows appears in the floodlighting status, and as shown in FIG. 9, when the convex structure and the concave structure have changed positions and are in place, a light path indicated by the arrows shows a spotlighting status.

In this embodiment, the optical structures of the first optical lens 31 and the second optical lens 32 are arranged in a ring shape, so that a positional relationship between the two optical structures can be achieved by rotating an angle of one of the optical lenses, and further the angle adjustment of the spotlighting and floodlighting can be achieved.

In this embodiment, the optical assembly 30 is fixed to the second lens holder 42 through the first lens holder 41 and is covered by the protective cover 45, and each connection is provided with a first sealing ring 81, a second sealing ring 82 and a third sealing ring 83 for sealing, so as to ensure the sealing performance of the optical assembly 30.

In this embodiment, a positioning structure 43 is further arranged between the first lens holder 41 and the second lens holder 42, and when the second lens holder 42 is rotated, the positioning structure is positioned to a predetermined angle.

Figure 4:
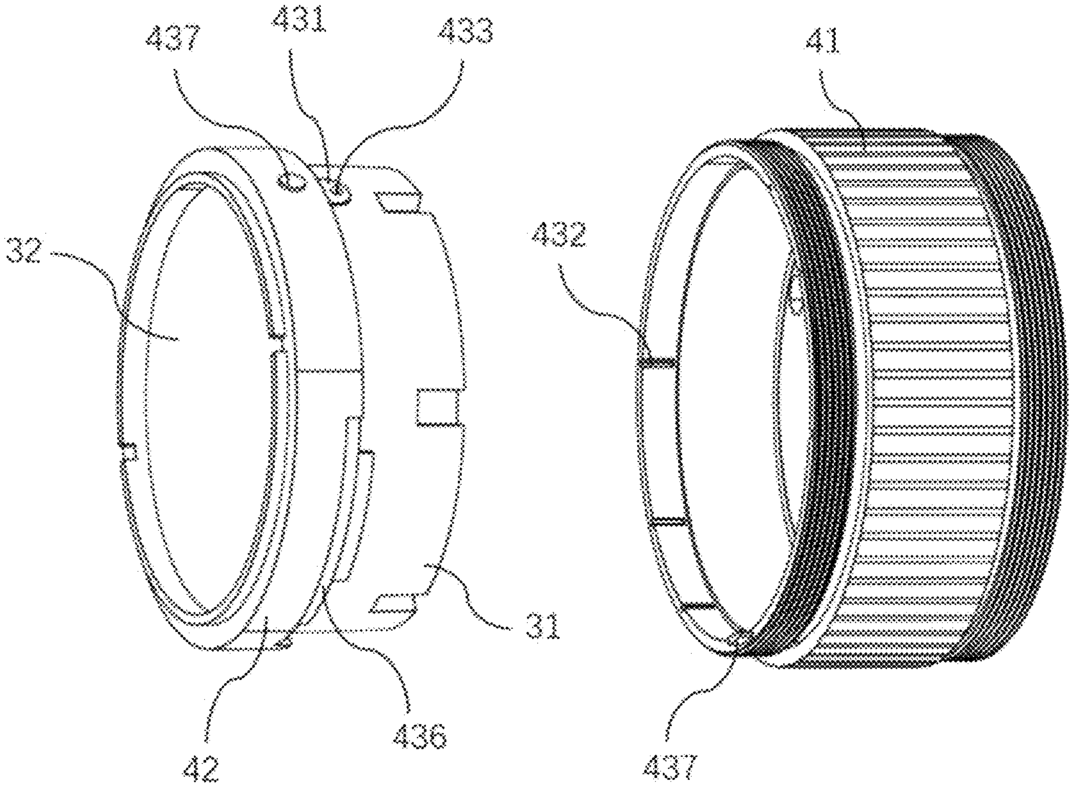
FIG. 4 is a schematic diagram of a positioning structure of an optical assembly according to an embodiment of the present invention.
Figure 5:
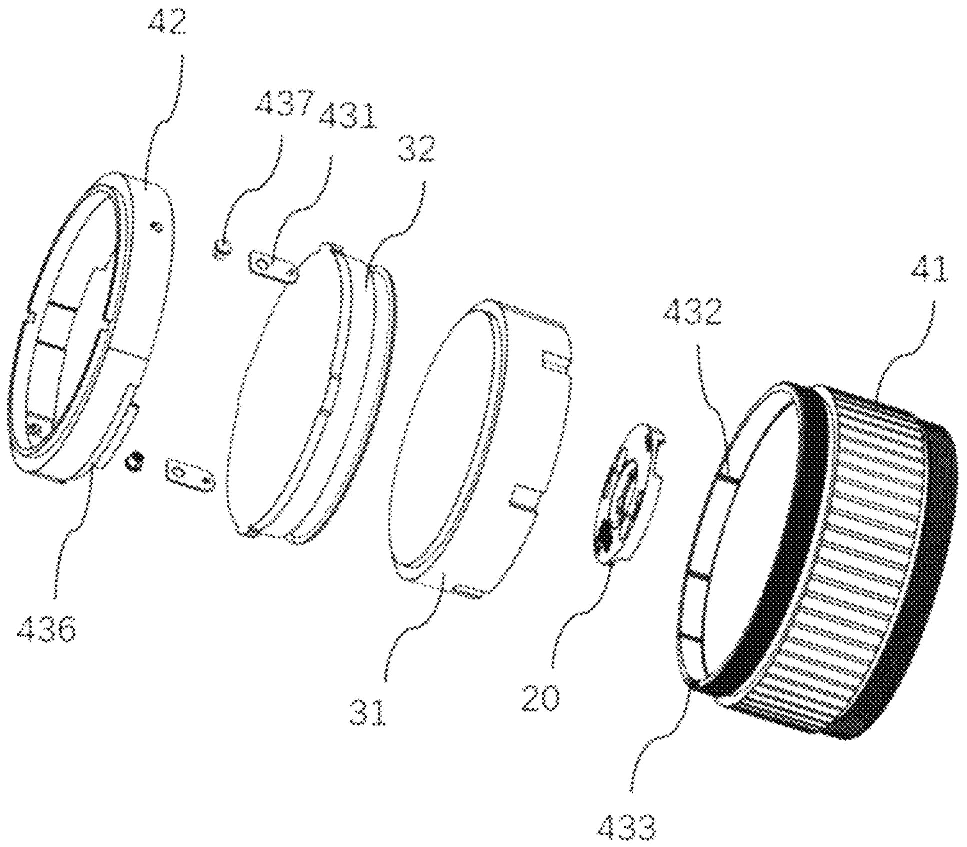
FIG. 5 is a schematic exploded view of a structure of an optical assembly and a holder thereof according to an embodiment of the present invention.
Figure 6:
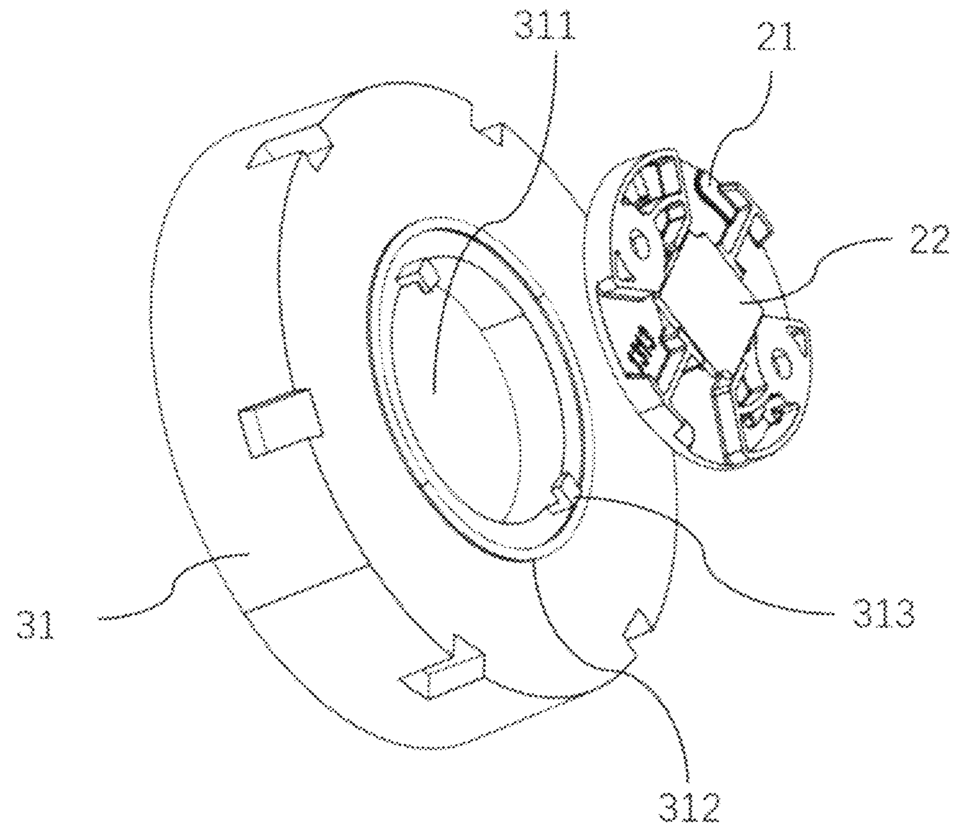
FIG. 6 is a schematic diagram of a structure of a first optical lens and a light source according to an embodiment of the present invention.

Specifically, as shown in FIGS. 4 and 5, the positioning structure 43 comprises a limiting elastic sheet 431 arranged on the second lens holder 42 and extending towards the first lens holder 41 and a first limiting groove 432 arranged on a peripheral wall of the first lens holder 41, wherein the limiting elastic sheet 431 is provided with a limiting bump 433 matched with the first limiting groove 432, and when the second lens holder 42 is rotated, the limiting bump 433 is embedded into the first limiting groove 432 to form limiting.

Figure 7:
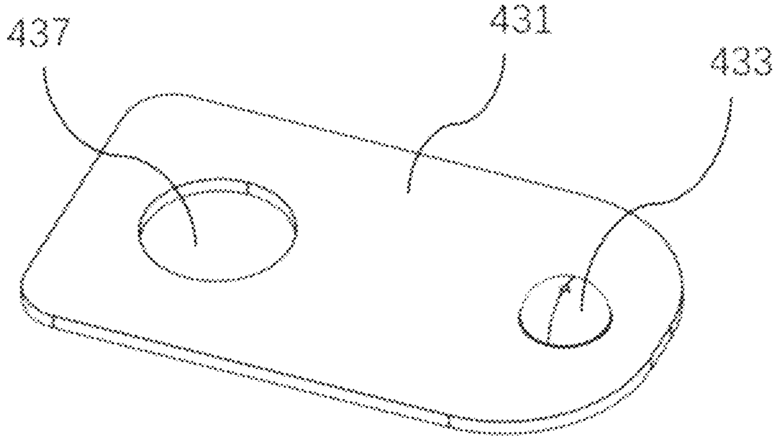
FIG. 7 is a schematic diagram of a structure of a limiting elastic sheet according to an embodiment of the present invention.

Further, as shown in FIG. 7, the limiting elastic sheet 431 is provided with a riveting hole 437 and a limiting bump 433, the limiting bump 433 has a certain elasticity, and the limiting elastic sheet 431 is arranged on the inner peripheral wall of the second lens holder 42 and extends towards a direction of the first lens holder 41. Wherein the limiting elastic sheet 431 is riveted on the second lens holder 42 through a rivet 437 and the riveting hole 437, and the first limiting groove 432 is arranged on the inner peripheral wall of the first lens holder 41. Certainly, the limiting elastic sheet 431 may also be arranged on the outer peripheral wall of the second lens holder 42, and the first limiting groove 432 may be arranged on the outer peripheral wall of the first lens holder 41. Since the limiting bump 433 is made of an elastic metal sheet, the limiting bump 433 can be separated from the limiting of the first limiting groove 432 by applying a certain force, thereby achieving the functions of angle adjustment and positioning after adjustment.

In some embodiments, the positioning structure 43 may further be a bead shifting screw arranged on an outer peripheral wall of the second lens holder 42 and a first limiting groove 432 arranged on the peripheral wall of the first lens holder 41, and when the second lens holder 42 is rotated, a shifting bead of the bead shifting screw is embedded into the first limiting groove 432 to form limiting.

Further, the positioning structure 43 comprises a second limiting groove 436 arranged on the second lens holder 42 and extending circumferentially, and a limiting boss 437 arranged on the first lens holder 41 and extending to the second limiting groove 436. Wherein two ends of the second limiting groove 436 limit the limiting boss 437 so as to limit a rotation range of the second lens holder 42.

In this embodiment, as shown in FIGS. 2 and 3, the angle adjustment mechanism 40 further comprises a protective cover 45 covering on the second lens holder 42 and fixedly connected to the first lens holder 41. The protective cover 45 can retain the second lens holder 42 on the first lens holder 41 to maintain the structural stability of the second lens holder 42.

In this embodiment, a first groove 311 is arranged on the light incident surface of the first optical lens 31, an annular boss 312 is further arranged on a periphery of a notch of the first groove 311, and a clamping buckle 313 is arranged in the annular boss 312. The light source 20 comprises a light source holder 21 and an LED 22 fixed on the light source holder 21, and the light source holder 21 is clamped in the annular boss 312 through the clamping buckle 313.

In this embodiment, as shown in FIGS. 2 and 3, a partition plate 417 is arranged inside the first lens holder 41, the first optical lens 31 is arranged at one side of the partition plate 417, a power supply board 27 is arranged at the other side of the partition plate 417, the power supply board 27 is fixed on the partition plate 417 by glue 28, and the power supply board 27 is electrically connected to a conductive board 29 on the lamp holder 10.

In this embodiment, the multi-angle adjustable spot-flood light further comprises a lamp holder bracket 70 rotatably connected to the lamp holder 10. The rotational connection between the lamp holder bracket 70 and the lamp holder 10 is angle-adjustable. Specifically, adjustment teeth can be used for adjustment.

It should be noted that the present invention is not limited to the above embodiments. According to the creative spirit of the present invention, those skilled in the art can also make other modifications, which should not be interpreted as limiting the scope of the present invention. It should be noted that all modifications and substitutions equivalent to the embodiment should be included in the scope of the present invention. Therefore, the scope of protection of the present invention shall be subject to the scope defined in the claims

What is claimed is:

1. A multi-angle adjustable spot-flood light, comprising: a lamp holder (10), a light source (20), an optical assembly (30) and an angle adjustment mechanism (40);

wherein the optical assembly (30) comprises: a first optical lens (31) and a second optical lens (32) that is spaced from and parallel to the first optical lens (31), wherein a first optical structure (106) is arranged on a light-emitting surface (104) of the first optical lens (31), and a second optical structure (107) is arranged on a light incident surface (105) of the second optical lens (32);

the angle adjustment mechanism (40) comprises: a first lens holder (41) fixedly connected to the lamp holder (10) and a second lens holder (42) rotatable relative to the first lens holder (41), wherein the first optical lens (31) is fixed on the first lens holder (41), and the second optical lens (32) is fixed on the second lens holder (42); and an angle of the second lens holder (42) is adjusted by rotation to change a position of the second optical structure (107) on the second optical lens (32) relative to the first optical structure (106);

wherein a positioning structure (43) is further arranged between the first lens holder (41) and the second lens holder (42);

wherein the positioning structure (43) comprises a limiting elastic sheet (431) arranged on the second lens holder (42) and extending towards the first lens holder (41) and a first limiting groove (432) arranged on a peripheral wall of the first lens holder (41), wherein the limiting elastic sheet (431) is provided with a limiting bump (433) matched with the first limiting groove (432), and when the second lens holder (42) is rotated, the limiting bump (433) is embedded into the first limiting groove (432) to form limiting.

2. The multi-angle adjustable spot-flood light according to claim 1, wherein the limiting elastic sheet (431) is arranged on an inner peripheral wall of the second lens holder (42) and extends towards a direction of the first lens holder (41), and the first limiting groove (432) is arranged on an inner peripheral wall of the first lens holder (41).

3. The multi-angle adjustable spot-flood light according to claim 1, wherein the positioning structure (43) comprises a bead shifting screw arranged on an outer peripheral wall of the second lens holder (42) and a first limiting groove (432) arranged on the peripheral wall of the first lens holder (41), and when the second lens holder (42) is rotated, a shifting bead of the bead shifting screw is embedded into the first limiting groove (432) to form limiting.

4. The multi-angle adjustable spot-flood light according to claim 1, wherein the positioning structure (43) comprises a second limiting groove (436) arranged on the second lens holder (42) and extending circumferentially and a limiting boss (437) arranged on the first lens holder (41) and extending to the second limiting groove (436); wherein two ends of the second limiting groove (436) limit the limiting boss (437) so as to limit a rotation range of the second lens holder (42).

5. The multi-angle adjustable spot-flood light according to claim 1, wherein the angle adjustment mechanism (40) further comprises a protective cover (45) covering on the second lens holder (42) and fixedly connected to the first lens holder (41).

6. The multi-angle adjustable spot-flood light according to claim 1, wherein a first groove (311) is arranged on the light incident surface of the first optical lens (31), an annular boss (312) is further arranged on a periphery of a notch of the first groove (311), and a clamping buckle (313) is arranged in the annular boss (312); wherein the light source (20) comprises a light source holder (21) and an LED (22) fixed on the light source holder, and the light source holder (21) is clamped in the annular boss (312) through the clamping buckle (313).

7. The multi-angle adjustable spot-flood light according to claim 1, wherein a partition plate (417) is arranged inside the first lens holder (41), the first optical lens (31) is arranged at one side of the partition plate (417), a power supply board (27) is arranged at the other side of the partition plate (417), and the power supply board (27) is fixed on the partition plate (417) by glue (28).

8. The multi-angle adjustable spot-flood light according to claim 1, further comprises a lamp holder bracket (70) rotatably connected to the lamp holder (10).

* * * * *